Figure 1:
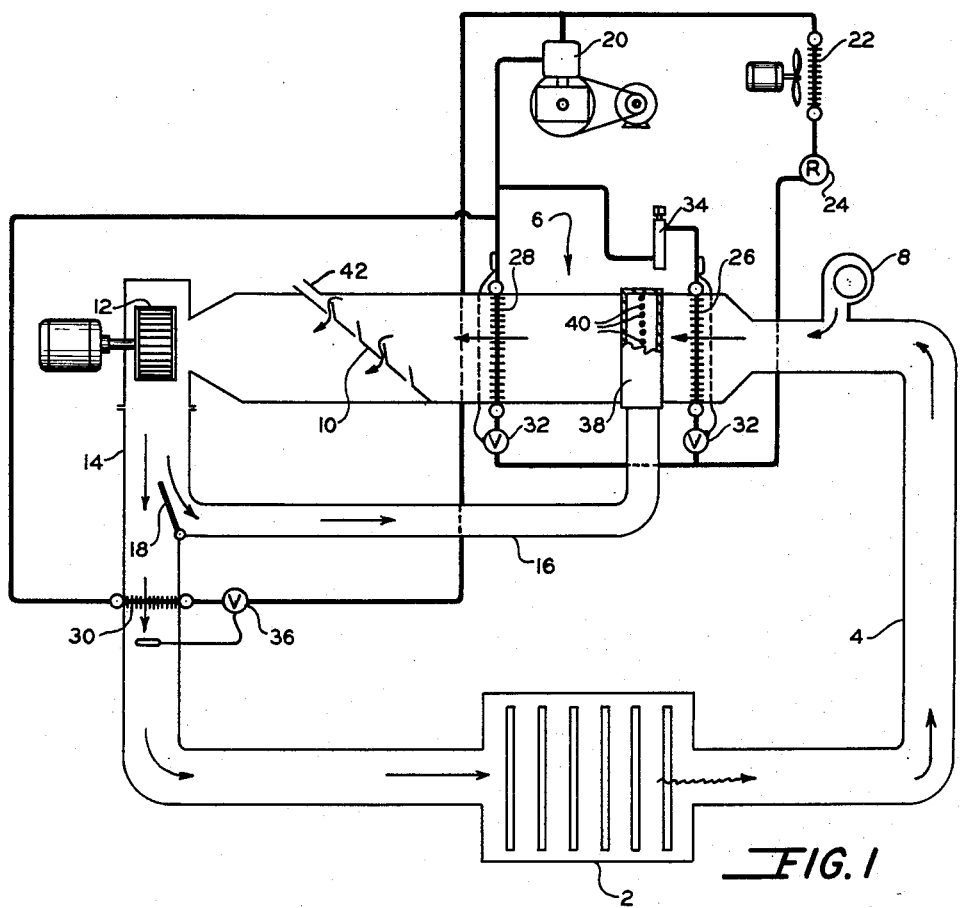

Jan. 28, 1964  S. G. SYLVAN  3,119,239

METHOD AND APPARATUS FOR COOLING AND DRYING AIR

Filed Aug. 18, 1961

INVENTOR.
STIG G. SYLVAN

BY Edward C. Arenz

ATTORNEY

United States Patent Office 3,119,239
Patented Jan. 28, 1964

3,119,239
METHOD AND APPARATUS FOR COOLING
AND DRYING AIR
Stig G. Sylvan, Louisville, Ky., assignor to American Air
Filter Company, Inc., Louisville, Ky., a corporation of
Delaware
Filed Aug. 18, 1961, Ser. No. 132,359
11 Claims. (Cl. 62—93)

This invention relates to a method and apparatus for cooling and drying air.

The cooling air for certain electronic equipment is required to be dried sufficiently that the moisture content is not over, say 0.002 pound of water per pound of air. To reduce the moisture content of normally encountered ambient air to such a value by simply cooling the air requires that it be cooled to slightly less than 20° F. If this temeprature reduction is accomplished by passing it through low temperature cooling coils, coil frosting and attendent problems may be normally expected. However, with the present invention, air may be cooled to temperatures below freezing while substantially avoiding coil frosting.

Thus, one object of this invention is the provision of a method and apparatus for removing moisture from air in an air cooling operation without encountering any appreciable coil frosting.

Another object is the provision of such a method and apparatus adapted for use with a mechanical refrigeration system having series air flow arranged cooling coils through which the air is passed.

In attaining these and other objects in accordance with one embodiment of the invention the air to be cooled and dried is first cooled, and dehumidified to a considerable degree, by passing it through an upstream cooling coil having a surface temperature slightly above freezing. Then a sufficient quantity of auxiliary air at a temperature substantially below freezing is mixed with the precooled air so that the temperature of the combined air is below freezing and a part of the moisture present in the air in the form of water vapor takes the form of snow and frost particles without physically contacting a heat exchange surface. This air carrying the snow and frost particles is then passed through a downstream cooling coil having a surface temperature well below freezing to cool further the air, and then the solidified moisture from the air mixing operation and from the further solidification of water vapor due to passage through the downstream coil is separated in the form of frost and snow from the air stream. It will thus be appreciated that the invention, in its broader aspects, contemplates that the air stream be subjected to an interval where the air temperature is reduced from above freezing to below freezing without contacting heat exchanging surfaces of below freezing temperatures during the interval.

Figure 2:
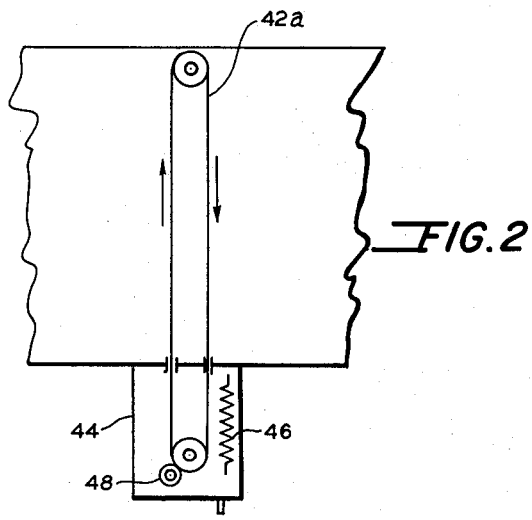

The invention will be explained in some detail in connection with the accompanying drawing illustrating apparatus incorporating the principles of the invention by way of example, and wherein:

FIGURE 1 is a diagrammatic view of apparatus for carrying out the invention including one type of snow separator; and, FIGURE 2 is a fragmentary view showing, in diagrammatic form, another type of snow separator adapted for use with the invention.

The air flow system, through which air flows in the direction indicated by the arrows, will be described first, and then the refrigeration system will be described. The electronic equipment compartment 2 is connected to discharge its heat load into air duct 4 which extends to the inlet of the air cooling section generally designated 6. A small air blower 8 is connected to the duct 4 to provide makeup air to replace any air lost in the snow separating operation. The air cooling section 6 includes an upstream and a downstream refrigeration coil and an intermediate air blender device, each of which will be considered in some detail later. The solidified moisture separator means, shown diagrammatically in FIGURE 1 as a louver 10, is downstream from the air cooling section and precedes the main blower 12 which has its outlet connected to cold air duct 14 extending back to the air inlet of the electronic equipment compartment 2. A branch duct 16 for conveying auxiliary air back to the cooling section 6 connects to cold air duct 14, and a damper 18 is provided at the junction to control the volume of air diverted into the branch duct from the cold air duct.

The components of the refrigeration system are generally conventional and therefore will not be described in any great detail. The system includes a refrigerant compressor 20 driven by a suitable motor, a condenser 22, a liquid refrigerant receiver 24, an upstream refrigerant evaporator or coil 26 and a downstream refrigerant evaporator or coil 28, and a hot gas or reheat coil 30 disposed in the cold air duct 14. These system components are connected to each other in convenitonal fashion as illustrated in FIGURE 1 by the refrigerant piping arrangement shown.

Both the upstream and downstream cooling coils 26 and 28 are provided with expansion devices 32 for controlling the flow of liquid refrigerant into these coils. Since in practicing the invention the cooling coils are operated with different surface temperatures (the downstream cooling coil having a considerably lower surface temperature than the upstream coil) an evaporator pressure regulator or back pressure valve 34 is provided in the suction line leading from the upstream coil 26 to the compressor 20 so that this coil may operate at a higher pressure than the downstream coil 28. To control the admission of hot gaseous refrigerant into reheat coil 30 from the compressor discharge, a temperature control valve 36 is provided in the line leading from the compressor discharge to the reheat coil. This valve is controlled in accordance with air temperature variations sensed by its control bulb positioned in the cold air duct 14 on the downstream side of the reheat coil 30.

In accordance with the invention, the branch or auxiliary air duct 16 has its outlet end connected to what is herein called an air blender 38 located between the two cooling coils 26 and 28. While the air blender 38 may take various forms, it is illustrated in FIGURE 1 as a casing or plenum encircling the cooling section duct work, and into which air from auxiliary duct 16 is delivered and then jetted into the cooling section duct through a series of holes 40 circumscribing the cooling section duct. It will be appreciated that the openings placing the interior of the plenum and the interior of the cooling section in communication may take the form of slots; or that a nest of apertured tubes may be arranged to extend across the interior of the cooling section with the apertures on the upstream faces thereof to discharge the auxiliary air in an upstream direction to minimize frosting on the tubes themselves. However, it is preferred that no structure extend across the cooling section because of the possibility of frosting thereof, and that the apertures 40 be canted somewhat to direct the jets of cold auxiliary air in a partly upstream direction. The cooling coils should be spaced sufficiently apart that under the contemplated operating conditions the auxiliary air and primary air are well mixed before passing through the downstream heat exchanger, and to this end, it is preferable that the air blender be positioned closely adjacent the downstream face of the upstream coil.

In operation of the apparatus the air flow through the system is as indicated by the arrows with that air passing through the electronic equipment compartment 2 picking up heat from the equipment and passing through duct 4 to the inlet of the cooling section 6. The upstream cooling coil 26 has a surface temperature slightly above freezing so that a substantial quantity of the moisture in the air is removed therefrom by condensation of moisture in liquid form upon the surfaces of the coil.

The cooled, dehumidified air leaving the upstream coil 26 is then mixed with auxiliary air introduced in the form of jets into the cooling section from the air blender 38 through the holes 40. Since this auxiliary air is obtained from cold air duct 14, its temperature is relatively low. The damper 18 at the junction of the cold air duct and the branch duct is set so that the quantity of auxiliary air introduced into the cooling section through the blender will be sufficient that, when mixed with the primary air leaving coil 26, the temperature of the combined air will be below freezing. Thus further condensation of the moisture in the air takes place in the form of frost and snow which is carried by the air. Since the tendency of moisture in the form of frost and snow particles to stick to a cooling coil having a surface temperature below freezing is relatively slight as compared to the tendency of moisture in liquid form to stick to such a coil, the downstream coil 28 may be operated with a surface temperature well below freezing without having that moisture in the form of solid particles coat the coil to any appreciable degree. The further cooling of the air effected by the downstream coil causes additional moisture in the air in vapor form to condense out as solid particles as will be readily appreciated. However, since this moisture in vapor form is at a temperature below freezing before the further cooling by the downstream coil occurs, it condenses out in a "dry" or solid state which does not tightly adhere to the cold coil surface, and that part which does initially stick to the surface is in the form of light, powdery frost which is easily dislodged by the air flow.

After leaving the downstream coil the air then passes through the separator section where a part of the moisture in solid form is separated from the air stream and removed from the air passage. The separator means may be in the form of a louver 10 as shown in FIGURE 1 wherein the solid moisture particles are separated from the air stream and discharged overboard through the outlet 42 with an accompanying slight wastage of the system air which is made up by blower 8. The cold, dry air leaving louver 10 then passes through the main blower 12 into cold air duct 14 from which a part of the air is diverted into the auxiliary air duct 16 and recirculated back to the blender 38. The other part of the air passes through the reheat coil 30, which may or may not be adding heat to the air depending upon the temperature of the air at the sensing bulb and the control setting of the valve 36, and then to the compartment 2.

It will be appreciated that the quantity of recirculation or auxiliary air which should be passed to the air blender 38 for mixing with the primary air leaving coil 26 will depend upon: (1) the temperature of the auxiliary air, (2) the temperature of the air leaving the upstream coil, and (3) the quantity of moisture still in the air as it leaves the upstream coil. When the system is first started in operation and assuming there is a substantial quantity of moisture in the system air, the amount of auxiliary air blended with the primary air should be considerably higher than after the system has been operated for some time and relatively little moisture is present in the air. Thus suitable means may be provided for controlling the position of damper 18 in accordance with requirements for auxiliary air.

The extent to which the reheat coil 30 receives hot gas from the compressor will also vary according to the operating condition of the apparatus. Thus, when the system is first placed in operation and the enthalpy of the initial air mass is high, no reheat of the air passing to the compartment 2 will be needed. The hot gas valve 36 will then be closed with the entire capacity of the refrigeration system available for use by the two cooling coils 26 and 28. As moisture is removed and the latent and sensible cooling load decreases, the hot gas valve will move toward an open position so that some reheat takes place. Consequently, some of the pumping capacity of the compressor is taken by this reheat coil and a reduction in the cooling capacity of the two cooling coils is automatically effected.

The exact form that the solid particle separator 10 takes is not important in itself so long as the device has a sufficiently high separating efficiency that the required dryness of the air leaving the separator is achieved. In that connection it is noted that since a part of the air leaving the separator is immediately recirculated through the branch duct, and the remainder of the air is recirculated in the system as a whole, the separator is not limited to the order of efficiency it would have if the air passed through it only once. One example of the type of separating equipment which might be used in place of the louver type of separator shown in FIGURE 1 is a cyclone type separator. As another alternative the blower 12 might be replaced by an air blower of the type structurally arranged so that the rotor performs a separating function as well as impelling the air.

The separator may also take the form of a filter such as illustrated in FIGURE 2 by way of example. In that case the louver 10 is replaced by an endless belt filter 42a wherein a portion of the belt travel is in a space apart from the main air passage. The filter illustrated may be of the general character disclosed in Boylan U.S. patent application Serial No. 58,929 filed September 28, 1960, same assignee wherein is disclosed an endless belt filter utilizing a flexible filter medium made of a plastic foam material such as polyurethane. In the employment of this type of filter in the apparatus of this invention, the section 44 located apart from the main air stream is provided with a heating element 46 for melting accumulated frost and snow from the belt as it is moved therepast. A squeeze roller 48 is provided to squeeze the water out of the belt before it re-enters the air stream. Since there is a negligible wastage of system air with the endless filter, the makeup air blower 8 may be omitted.

An understanding of the system operation may be facilitated by a description of the condition of the air at various stages in the system assuming certain operating values as examples. If it is assumed that the air leaving first coil 26 is at 40° F. and is saturated, the moisture content of that air in the form of water vapor is about 0.0052 pound per pound of air. Then, if 0.6 pound of auxiliary air at 10° is mixed with 1 pound of the 40° air to attain a temperature of 30° of the combined air, the combined 1.6 pounds of air will contain about 0.00552 pound of water in the form of solid vapor and the remainder of the moisture (0.00048 pound) will have condensed in the form of snow particles. With the downstream coil operating at a sufficiently low temperature that the air leaves it at 10°, the 1.6 pounds of combined air will contain about 0.00208 pound of water in the form of solid vapor with an additional 0.00344 pound of moisture having been condensed out in the form of additional snow in the heat exchanging operation involving the downstream coil. Thus the 1.6 pounds of combined air entering the separator contains 0.00208 pound of moisture in vapor form and 0.00392 pound of moisture in frost and snow form. It will be appreciated from the foregoing examples that while a great deal of moisture is condensed out of the air in the form of snow by the time it reaches the separator, the snow content of the air entering the second coil is relatively low with most of the moisture content being in the form of solid vapor.

While the invention has been described in connection with a system utilized in connection with an electronic equipment compartment wherein the air is for the most part recirculated, it will be appreciated that it can be used in other air cooling and drying systems including those which do not have a substantially closed air flow system.

The invention claimed is:

1. In a method for cooling air and removing moisture therefrom: precooling a quantity of primary air in an upstream zone to a temperature close to freezing; adding a sufficient quantity of auxiliary air at a temperature below freezing to said pre-cooled air to obtain a temperature of said combined air below freezing whereby a part of the moisture in said combined air is condensed in solid form; cooling said combined air to a substantially lower temperature by passing it through a heat exchanger having a surface temperature substantially below freezing; and then separating and removing moisture in solid frozen particle form from said combined air stream.

2. In a method for cooling air and removing moisture therefrom: pre-cooling a quantity of primary air in an upstream zone to a temperature close to freezing; adding a sufficient quantity of auxiliary air at a temperature below freezing to said pre-cooled air to obtain a temperature of said combined air below freezing whereby a part of the moisture in said combined air is condensed in solid form; cooling said combined air to a substantially lower temperature by passing it through a heat exchanger having a surface temperature substantially below freezing; passing said combined air carrying moisture in solid frozen particle form through a filtering medium extending across said air stream to filter said particles therefrom; and moving portions of said filtering medium progressively out of said air stream with said filtered particles therein.

3. The method of claim 2 including: applying heat to the portions of said filtering medium located out of said air stream to melt said filtered particles.

4. In a method of cooling and dehumidifying a moisture-containing gas flowing through a passage: cooling said gas at an upstream location in said passage to a temperature slightly above freezing; reducing the temperature of said gas to less than freezing by mixing said gas with a volume of a sufficiently low temperature medium at an intermediate location to condense out a part of the moisture from said gas in frozen particle form; passing said gas in heat exchanging relationship through a cooling coil having a surface temperature well below freezing to further cool said gas and to condense out additional moisture in frozen particle form; and removing said frozen particles from said passage.

5. In a method of minimizing coil frosting in reducing the temperature of a flowing gas substantially above freezing to well below freezing while passing it through successive cooling coils: mixing a volume of sufficiently low temperature auxiliary gas with a main gas volume, which has a temperature above freezing, to produce a temperature of said combined gases below freezing before passing said main gas volume in heat exchanging relation with a cooling coil having a surface temperature below freezing.

6. In a system for cooling air and removing moisture therefrom in an air passage: means for moving said air through said passage; an upstream heat exchanger in said passage; means for operating said upstream heat exchanger with a surface temperature slightly above freezing; a downstream heat exchanger in said passage; means for operating said downstream heat exchanger with a surface temperature below freezing; means for introducing a sufficient quantity of auxiliary air into said passage between said upstream and downstream heat exchanger at a temperature sufficiently below freezing that the temperature of the combined air comprising said air passing through said upstream heat exchanger and said auxiliary air is below freezing before said combined air reaches said downstream heat exchanger; means downstream from said downstream heat exchanger for separating and removing moisture in frozen particle form from said air.

7. The system of claim 6 wherein: said means for introducing said auxiliary air into said passage includes auxiliary air passage means connected to recirculate said auxiliary air from downstream of said separating means to said location between said upstream and downstream heat exchangers.

8. In a method of minimizing frosting of a cooling coil having a surface temperature below freezing:
(a) reducing the temperature of a flowing gas from above freezing to below freezing by mixing a volume of sufficiently low temperature auxiliary gas with a main gas volume, which has a temperature above freezing, to produce a temperature of the combined gases below freezing;
(b) and then passing said combined gases in heat exchanging relation through said coil.

9. In apparatus for cooling gas and removing moisture therefrom:
(a) a passage;
(b) an upstream heat exchanger therein having a surface temperature above freezing;
(c) a downstream heat exchanger therein having a surface temperature below freezing;
(d) means for passing a quantity of primary gas through said passage and through said heat exchanger;
(e) means for introducing a quantity of auxiliary gas into said passage between said heat exchangers, said auxiliary gas having a sufficiently low temperature that the combined primary and auxiliary gas temperature is below freezing; and
(f) means for separating and removing moisture from said combined gas downstream from said downstream heat exchanger.

10. The apparatus of claim 9 including: means for obtaining said auxiliary gas from a location downstream from said separation and removal location.

11. In apparatus for cooling air:
(a) an air passage;
(b) series air flow arranged heat exchangers in said passage;
(c) means for passing a volume of primary air through said heat exchangers;
(d) means for maintaining an upstream one of said heat exchangers with a surface temperature slightly above freezing;
(e) means for mixing a sufficient volume of secondary air having a sufficiently low temperature with said primary air to produce a below freezing temperature of the combined air before said combined air reaches the heat exchanger downstream from said upstream heat exchanger; and
(f) means for maintaining said downstream heat exchanger with a surface temperature below freezing.

References Cited in the file of this patent

UNITED STATES PATENTS

| | | |
|---|---|---|
| 1,863,579 | Morse | June 21, 1932 |
| 2,054,158 | Hadjisky | Sept. 15, 1936 |
| 2,085,964 | Fonda | July 6, 1937 |
| 2,172,877 | Parcaro | Sept. 12, 1939 |